G. PARKS.
INSECT CATCHER.
APPLICATION FILED MAY 26, 1917.
1,248,899.
Patented Dec. 4, 1917.
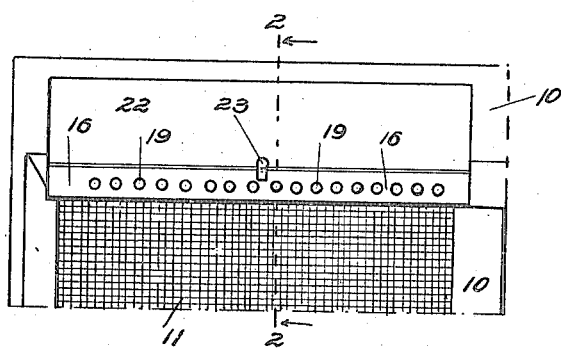
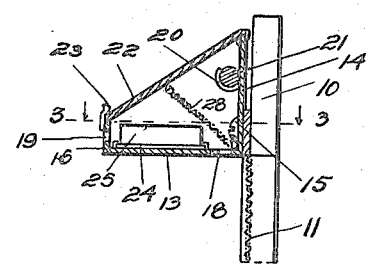
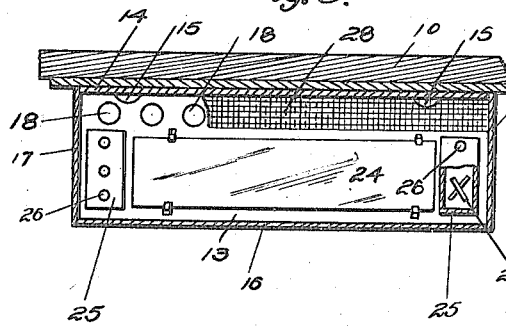
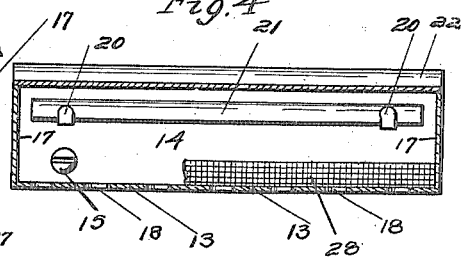
Inventor
Grace Parks

UNITED STATES PATENT OFFICE.

GRACE PARKS, OF BOONE, IOWA.

INSECT-CATCHER.

1,248,899. Specification of Letters Patent. Patented Dec. 4, 1917.

Application filed May 26, 1917. Serial No. 171,317.

*To all whom it may concern:*

Be it known that I, GRACE PARKS, a citizen of the United States, and resident of Boone, in the county of Boone and State of Iowa, have invented a certain new and useful Insect-Catcher, of which the following is a specification.

The object of my invention is to provide an insect catcher of simple, durable and inexpensive construction.

More particularly it is my object to provide such a device adapted to be mounted on a swinging screen door, having an opaque bottom with entrance openings in one portion thereof, having above said openings an inclined screen member, a handle on said screen member, and a bait holding device, the entire device having a removable cover.

Still a further object is to provide such a device having spaced from the entrance openings light openings, and between the light openings and the entrance openings a fly destroying element.

Still a further object is to provide such a device having a receptacle for a disinfectant, said receptacle containing a member adapted to be agitated when a screen door on which the entire device is mounted is vibrated.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a front elevation of a part of a screen door having my improved insect catcher mounted thereon.

Fig. 2 shows a vertical, sectional view taken on the line 2—2 of Fig. 1;

Fig. 3 shows a horizontal, sectional view taken on the line 3—3 of Fig. 2, and

Fig. 4 shows a sectional view taken on the line 4—4 of Fig. 2.

In the accompanying drawings, I have used the reference numeral 10 to indicate generally the frame of a screen door secured to which is ordinary screen wire or the like 11.

My improved insect catcher comprises a receptacle having a bottom 13 and the rear wall 14, designed to be mounted on a support, as for instance, on the screen door frame, by means of screws 15 or any suitable way. At the front of the receptacle is an upwardly extending wall 16 of considerably less height than that of the wall 14.

The end walls 17 are inclined at their upper edges from the upper edge of the rear wall 14 to the upper edge of the front wall 16.

In the bottom 13 near the rear wall 14 is a series of inlet openings 18 of proper size to permit the passage of flies therethrough.

In the front wall 16 is a plurality of openings 19 of proper size to admit light, but too small to permit the escape of flies therethrough.

Extending inwardly from the rear wall 14 and spaced considerably above the bottom 13 are supporting brackets or the like 20.

Mounted on the brackets 20 is a bait holding member 21.

Pivoted or hinged to the upper edge of the rear wall 14 is a movable cover member 22.

On the front wall 16 is a spring clip 23 designed to yieldingly engage and hold the cover 22 in its closed position.

On the bottom 13 forwardly of the openings 18 rests a fly catching element 24, which may be a poison pad, sticky fly paper or any other device suitable for the purpose.

At the ends of the device there are containers 25 having in their walls openings 26, which containers are designed to hold disinfectant.

Inside each container is a movable member 27 which may have any suitable form, as, for instance, that of the ordinary child's "jack," which serves as an agitating member for distributing the disinfectant when the screen door on which the insect catcher is hung, is vibrated.

Extending from the rear part of the receptacle upwardly and forwardly above and past the openings 18 substantially to the cover 23, when the latter is closed, is a partition 28 of any suitable kind to permit the proper discharge of air, preferably made of a strip of screen wire.

In the practical use of my improved insect catcher the device is mounted on the frame 10, of a screen door with the rear wall member 14 secured to the screen door.

The cover 22 may be raised for putting in place the insect destroying element 24, and the disinfectant in the receptacles 25.

When the cover 22 is closed, the device is ready for use.

It is well known that flies tend to crawl upwardly on the outside of a door. Where my improved insect catching device is fastened near the top of the door, which is the preferable place for it, the flies crawling over the screen will pass through the openings 18 into the forward interior of the insect catcher.

They will be attracted by the odor of the bait member 21.

Unless on the inside they will fly against the screen partition 28 and will sooner or later move toward the light coming through the openings 19. In this connection it may be noted that the parts 24 and 28 are so arranged that the rear beveled edge of the member 28 is quite close to the member 24, so as to allow only a narrow passageway between them through which the flies may travel. As a matter of fact, the flies will be very largely caught by the insect destroying element 24.

All the flies alive or dead in the device may be thoroughly fumigated by the disinfectant in the receptacles 25.

It will also be noted that the cover 22 furnishes an inclined wall down which the flies may travel in moving toward the light openings 19, and that such path of travel brings the flies into contact with the member 24.

Some changes may be made in the construction and arrangement of the various parts of my improved insect catcher without departing from the essential spirit and purpose of my invention, and it is my intention to cover by the patent to be issued hereon any modified forms of structure or use of mechanical equivalents which may be reasonably included within the scope of my claims.

I claim as my invention:

1. In a device of the class described, a receptacle having end walls, a bottom, a rear wall and a front wall shorter in height than said rear wall, a top hinged to the upper edge of said wall, and designed to be secured to the front wall, said bottom having an opening near said rear wall, a screen inclined upwardly from said rear wall and forwardly to the top and an insect destroying element on said bottom forwardly of said opening.

2. In a device of the class described, a receptacle having end walls, a bottom, a rear wall and a front wall shorter in height than said rear wall, a top hinged to the upper edge of said rear wall, and designed to be secured to the front wall, said bottom having an opening near said rear wall, a screen inclined upwardly from said rear wall and forwardly to the top, an insect destroying element on said bottom forwardly of said opening, a bait holder in the upper part of said receptacle above said screen.

3. In a device of the class described, a receptacle having end walls, a bottom, a rear wall and a front wall shorter in height than said rear wall, said bottom having an opening near said rear wall, a cover inclined from said rear wall downwardly and forwardly to the upper edge of said front wall, an insect destroying element on said bottom forwardly of said opening and a holder for disinfectant in said receptacle.

4. In a device of the class described, a receptacle having end walls, a bottom, a rear wall and a front wall shorter in height than said rear side wall, a top hinged to the upper edge of said rear wall and designed to be secured to the front wall, said bottom having an inlet opening near said rear wall, a screen inclined from said rear wall near its lower edge upwardly and forwardly to the top, an insect destroying element on said bottom forwardly of said opening, a holder for disinfectant in said receptacle, and a device in said holder adapted to agitate the contents when said receptacle is vibrated.

May 17, 1917.

GRACE PARKS.

Copies of this patent may be obtained for five cents each, by addressing the "Commissioner of Patents, Washington, D. C."